United States Patent [19]

Kauffman

[11] Patent Number: 5,505,329

[45] Date of Patent: * Apr. 9, 1996

[54] MULTI-WALLED PANELS

[75] Inventor: Donn K. Kauffman, Daphney, Ala.

[73] Assignees: International Fiberglass Products, Inc.; Bosbur, Inc., both of Mobile, Ala.

[*] Notice: The portion of the term of this patent subsequent to Aug. 3, 2010, has been disclaimed.

[21] Appl. No.: 165,261

[22] Filed: Dec. 10, 1993

Related U.S. Application Data

[63] Continuation-in-part of Ser. No. 56,354, May 1, 1993.

[51] Int. Cl.$^6$ ................................................. B65D 25/00
[52] U.S. Cl. ........................... 220/445; 220/444; 220/645; 73/49.2
[58] Field of Search .................................... 220/444, 445, 220/586, 420, 645; 73/49.2

[56] References Cited

U.S. PATENT DOCUMENTS

| | | | |
|---|---|---|---|
| 5,143,244 | 9/1992 | Kauffman | 220/445 |
| 5,232,119 | 8/1993 | Kauffman | 220/445 |
| 5,308,423 | 5/1994 | Kauffman | 156/171 |
| 5,368,670 | 11/1994 | Kauffman | 156/171 |

*Primary Examiner*—Steven M. Pollard
*Attorney, Agent, or Firm*—George L. Williamson

[57] ABSTRACT

Multi-walled panel-like structure having an upper and lower wall integrally bonded to support ribs located therein between with closed cell foam being placed in the interstitial spaces between the walls and ribs. Improved strength is provided by this apparatus and method of construction. The invention is particularly suited for retrofitting single wall tanks and tank bottoms to be double walled tanks and tank bottoms.

7 Claims, 3 Drawing Sheets

U.S. Patent    Apr. 9, 1996    Sheet 2 of 3    5,505,329
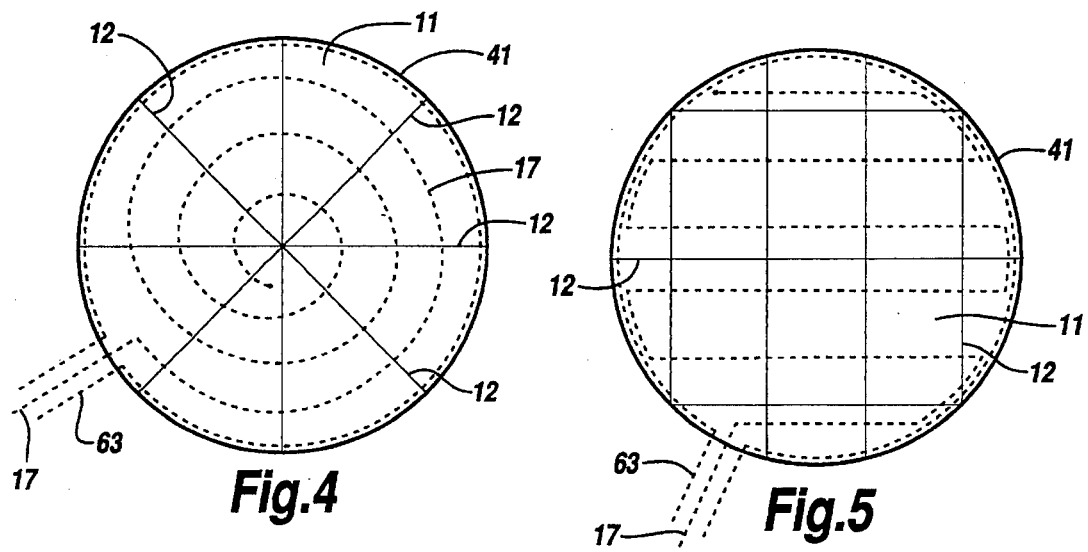
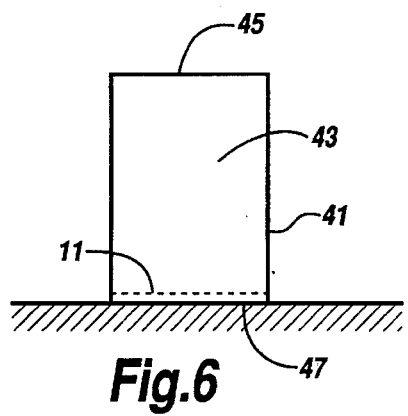
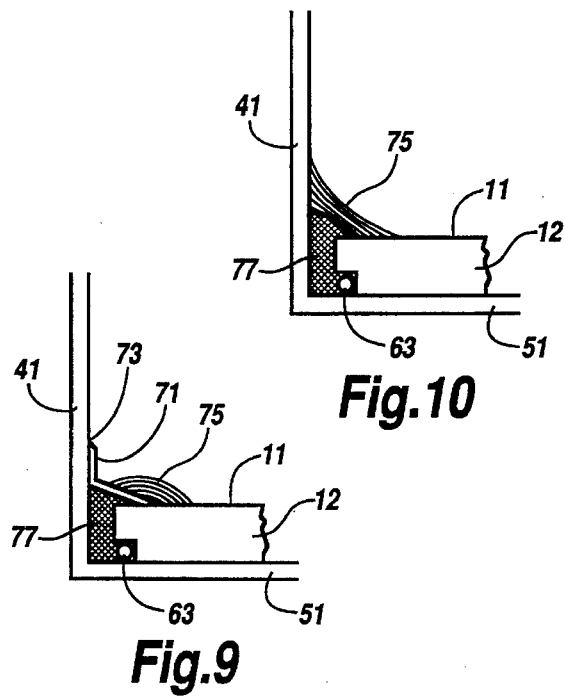
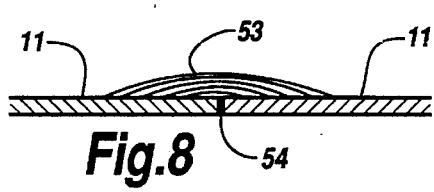
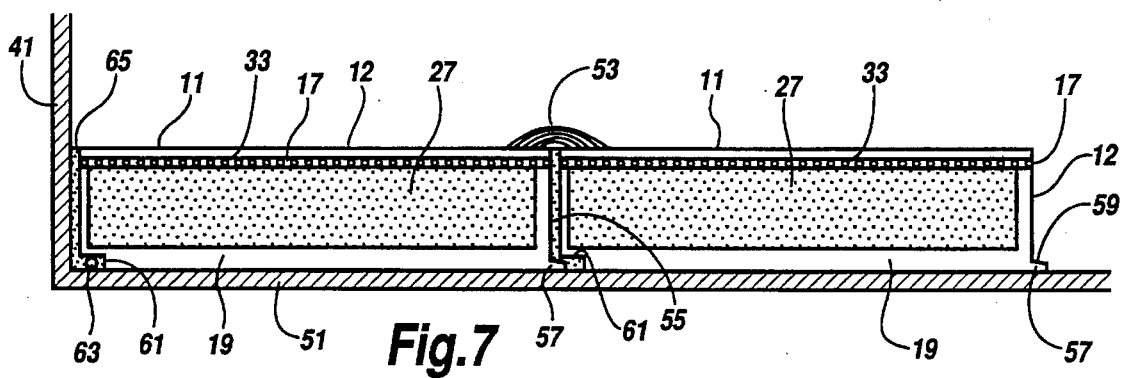

MULTI-WALLED PANELS

BACKGROUND OF THE INVENTION

This application is a continuation-in-part of Ser. No. 08/056,354 filed May 1, 1993.

This invention generally relates to rigid multi-walled structures such as storage tanks for underground and/or aboveground placement which are used for holding hazardous, toxic, and/or corrosive fluids, fluids and petroleum products such as solvents, diesel fuel and/or gasoline. More particularly, this invention relates to multi-walled panel-like structures. This invention also relates to a method of manufacturing such structures and for installing said structures in existing single wall tanks to modify the tanks to be double walled tanks.

An increasing number of Federal Regulations relating to the design and strength of certain storage vessels to better insure containment of toxic or corrosive materials and to avoid contamination of the environment by release, now provide for double walled tanks, some of which permit leak alarms to be installed in the tanks. In many instances heretofore, the space between the layers in multilayer tank walls was usually filled with air, insulating material or rigid support members to avoid rupture of the container walls under stress.

Numerous attempts have been made to provide pressure tight and leak proof containers able to withstand stress caused by lateral forces utilizing the placement of seams, bolts and/or other supports, for example, in addition to placing detection systems in the event of fluid leaks.

In U.S. Pat. No. 4,098,426 for example, the use of unpartitioned end walls coupled with support flanges was used in order to optimize the transmission of axial forces of inertia and to prevent fluid leakage at the joint seams of the two container shells of steel or aluminum alloy. Because the ultimate use of these metal tanks was for cryogenically effected fluids, a foamed insulating material was loosely provided between the vessels for insulation purposes. However, no indication is provided as to the relative strength of those vessels, neither were any ribs integrated into the insulating wall for support.

Still other references are found such as U.S. Pat. No. 3,392,865 where filament-wound plastic shells employ closed shell polyurethane foams for thermal protection where a blender ply was used to provide gas conductance to a pressure tap in the event of gas leakage but again no indication is made as to the strength of the vessels described and in particular to the values of the lateral and axial inertia. Similarly, no method for making the interior containment wall comprising integrated ribs for support and positive total attachment is disclosed.

Anderson, in U.S. Pat. No. 3,335,904, disclosed a non-metallic horizontal storage tank especially suitable for the underground storage of liquid hydrocarbons comprising a plastic sandwich construction having an enclosing wall forming a tubular body portion and end walls defining a substantially closed hollow structure, said tank including an inner skin and an outer skin space therefrom and including core material of relatively low structural strength between said skins, the tubular body portion having circumferential reinforcing rib means between said inner and outer skins. Bastone, in U.S. Pat. No. 3,412,892, discloses an underground storage tank, including layers of continuous filament wound fiberglass with layers of chopped fiberglass reinforced resin to produce a monolithic composite layer structure. Furthermore, Bastone teaches the use of a polyurethane foam support rib. Sharp, in U.S. Pat. No. 4,739,659, disclosed a double wall ribbed storage tank with secondary containment capability including the provision of a leak alarm safety monitor. Dallum, in U.S. Pat. No. 4,876,124, disclosed a tank having a composite wall including an inner wall and an outer wall, the inner wall comprising a material resistant to corrosion by gasoline or alcohol and the outer wall comprising a non-hydrolyzable resin. Pugnale, et al., in U.S. Pat. No. 4,781,777 disclosed a double wall tank having inner and outer walls.

Kauffman, Applicant for this application, in U.S. Pat. No. 5,143,244 and 5,232,119 disclosed a multi-walled apparatus having improved strength characteristics due to the fact that the inner and outer walls were integrally bonded together through ribs placed therein between.

From these and other references, it will be understood to those skilled in the art that multi-walled fiberglass reinforced fluid holding tank walls require improved strength, extreme resistance to lateral pressure and require a high axial force of inertia.

It is an object of this invention to allow existing single wall tanks to be retrofitted with the present invention so as to become a double walled tank.

It is an object of this invention to provide a process for making storage tank wall and bottom sections which possess a high axial force of inertia, are extremely rigid and are resistant to the stress of variable temperatures and movement.

It is a further object to provide storage tank sections of improved strength which are resistant to pressure when placed aboveground or underground and which can be made quickly and inexpensively.

SUMMARY OF THE INVENTION

The present invention provides for multi-walled panel-like sections having an inner wall and an outer wall separated by and supported by ribs, which ribs are 100% bonded to and integrally bonded with and/or laminated to the inner and outer walls. The walls are composed of chopped glass fiber strands impregnated with resin. Closed cell foam is also provided in the interstitial spaces between the walls. Additionally, a highly chemically resistant barrier is mixed with the chopped glass fiber and is applied to the entire inner surface of the inner wall sections. Furthermore, a leak alarm conduit is provided between the inner and outer layers. Panel sections are designed as cells in order to allow a leak alarm to indicate the exact location of a leak. This design provides for a panel section that has improved strength characteristics and the present invention provides for a wall section having a moment of inertia which is believed to be as high as 4.67 $in^4$ which substantially eliminates torquing, buckling and rupturing.

The term "fiberglass" as used in this specification will generally denote glass fiber reinforced resinous material either cured or uncured. When a glass fiber reinforced resinous material cures, it hardens and is frequently referred to in the industry as a laminate meaning generally the cured composite structure. Also, depending on the context, the term "fiberglass" may at times refer to fiber or a thin layer of woven glass fibers.

A method for constructing a panel-like structure made according to the present invention is also provided. In summary, this includes: (1) providing a rigid mold of acceptable size; (2) applying a release agent to the mold; (3)

forming the lower, first or bottom layer or wall of the structure of chopped fiberglass; (4) applying a first layer of rib shaped foam which acts as a form for the formation of support ribs; (5) forming the support ribs of chopped fiberglass; (6) applying a second layer of bridging foam between the ribs up and approximately level with the tops of the ribs; (7) placing leak alarm conduit between and outside the ribs for later containment of the leak alarm cable; (8) forming the upper or top layer, second or wall of the structure of chopped fiberglass; and (9) applying a highly chemically resistant barrier to the inner surface of the structure. This is the general method to form a single panel-like structure or section.

In order to accomplish a major object of the present invention, i.e., to modify or retrofit an existing single wall storage tank with the double wall sections, it is necessary to place multiple panel-like structures or sections of the present invention side by side and end to end inside the existing single wall tank. This is expected to be required only on the bottom of the existing single wall tank; and, is made necessary due to new environmental regulations requiring existing single wall storage tanks to have secondary containment and leak detection on the tank bottoms. Note that the double-walled sections of the present invention are made outside the storage tanks and then transported into and installed inside the storage tank.

These and other objects are achieved in the present invention by providing an improved multi-walled section of high strength and rigid construction whose method of construction is simple and less time consuming than the prior art.

A further object of the present invention is to provide a new and novel underground and/or aboveground fluid storage tank which provides for an optional safety monitor in the event of fluid leakage or spillage. The present invention provides the only true environmental protection double walled section with a positive leak alarm that is actuated within a short time of the leak. This wall section is designed with compartments or alternating closed cells which enables the leak alarm to indicate the exact location of the leak. This eliminates the need to remove the tank from the ground to find the leak or perform a clean-up of the tank and/or soil, saving a great deal of time, money and product lost into the ground. The compartmentalized tank can be repaired in place because the alarm locates the leak accurately and indicates it on the computer readout.

The present invention provides wall sections having a 100% bond between the ribs and the inner and outer structural wall section. The present invention improves over the prior art wall sections of this type by integrating the construction of the upper and lower walls, the reinforcing ribs, and the foam material between the walls. The ribs are built up over the rib shaped foam which act as forms for the ribs, so that the ribs and rib foot become laminated to the lower wall. The upper wall is then built up over the ribs and the briding foam layer located between the ribs, so that the upper wall becomes, laminated and bonded to the ribs and results in a relatively level, smooth wall having no undulations. This integration of the ribs and both walls provides greater strength than do other constructions wherein the parts are not positively interconnected and 100% bonded to each other. The bridging foam which is placed between the ribs acts merely as an aid to assure that the outer wall is 100% bonded to the top of the rib, i.e., the foam in between the ribs is only there to act as a form so as to allow the outer wall to be layed up evenly without wrinkling or having severe undulations. This integrated construction increases the moment of inertia of this wall section.

The closed cell foam material used in the present invention is somewhat compressible. It is a further object of the present invention, to assure that no material, e.g., foam, is placed in the interstitial spaces between the walls of the present invention that could cause a rupture, collapse or other failure due to the interaction of materials having different thermal coefficients of expansion which interaction could be caused by changing temperature conditions.

BRIEF DESCRIPTION OF THE DRAWINGS

FIG. 4 is a plan view of one embodiment of the top layer of the present invention showing multiple panel sections.

FIG. 5 is a plan view of one embodiment of the top layer of the present invention showing multiple panel sections.

FIG. 6 is an elevation view of a vertically standing storage tank.

FIG. 7 is a cross section view of multiple sections of the present invention joined together.

FIG. 8 is an elevation view of an exemplary butt and strap joint.

FIG. 9 is an elevation view showing alternative means for attaching the panels to the tank walls.

FIG. 10 is an elevation view showing alternative means for attaching the panels to the tank walls.

Note that the drawings are not to scale. Details of the drawings which would normally appear as hidden lines may be omitted for ease of understanding.

DETAILED DESCRIPTION OF THE PREFERRED EMBODIMENT(S)

Containment vessels, such as tanks for aboveground and underground storage are useful in transporting and holding fluids such as petroleum products like gasoline, alcohol enhanced gasoline, jet fuel, diesel fuel, oxygenated fuels, fuel oil with certain temperature limitations, and corrosive substances and the like which spillage thereof would be environmentally detrimental, costly and dangerous. The bottom of the tanks retrofitted with the double wall structures or panel-like sections of the present invention, for example, would be composed of multi-containment walls or layers constructed of fiberglass or glass fibers in chopped glass fibers bonded with a suitable resin.

It should be noted that the term "fiberglass" as used in this specification will generally refer to a glass fiber reinforced resinous material either cured or uncured. When a glass fiber reinforced resinous material cures, it hardens and is frequently referred to in the industry as a laminate meaning generally the cured composite structure. Also, depending on the context, the term "fiberglass" may at times refer to glass fiber strands.

Between these multiple layers, in the air space or interstitial space, is placed closed cell foam such as a urethane foam, between the outer wall of the tank and the inner wall of the tank. In a preferred embodiment, a leak alarm conduit and cable is placed between these walls in order to detect fluid leaks and provide an appropriate alarm to the operator.

The structures of the present invention must likewise resist structural failures, e.g., buckling. The tank wall and bottom sections of the present invention are designed, and have been successfully tested, to withstand a combination of internal and external loads due to burial and internal pressure due to partial vacuum unlike those of the prior art. This is a unique and novel improvement of the present invention over the the prior art.

Replacement of the air between the walls or interstitial space with a continuous core material, such as polyurethane and the like, improves the insulative qualities of the tank wall section and results in decreased condensation of moisture on the inside of the tank.

Figure 1A:
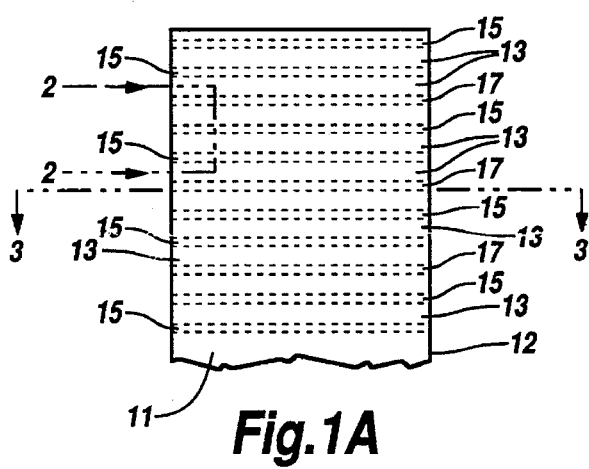
FIGS. 1a and 1b are partial plan views of the top layer of the panel-like structure of the present invention.

Turning to the drawings, FIG. 1a shows a partial of the top wall or layer, 11, of a single section, 12, of a panel-like structure of the present invention. The top of the multiple ribs are shown at 13, along with the multiple rib feet, 15, with the leak alarm conduit, 17. FIG. 1a is an embodiment wherein the ribs run parallel to the shorter edge of the panel, 12.

Figure 1B:
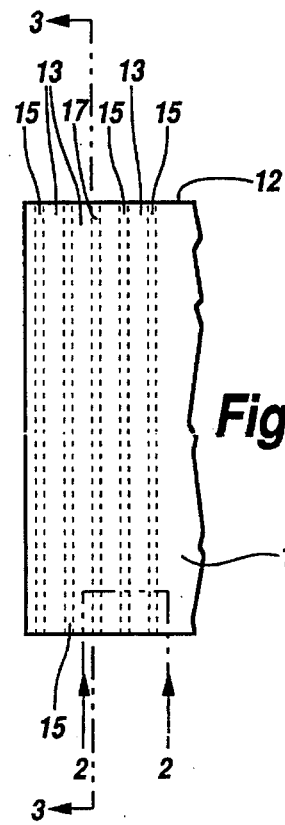

FIG. 1b shows another embodiment of the present invention wherein the ribs run parallel to the longer edge of the panel-like structure, 12. Therein is shown the panel, 12, the top layer of the panel, 11, the top of the ribs, 13, the rib feet, 15, and the leak alarm conduit, 17. Note that the panel-like structures of the present invention are generally rectangular shaped and in practice are about 8 feet by 20 feet in size although they can be made in many sizes and shapes according to the needs or specifications of the customer.

Figure 2:
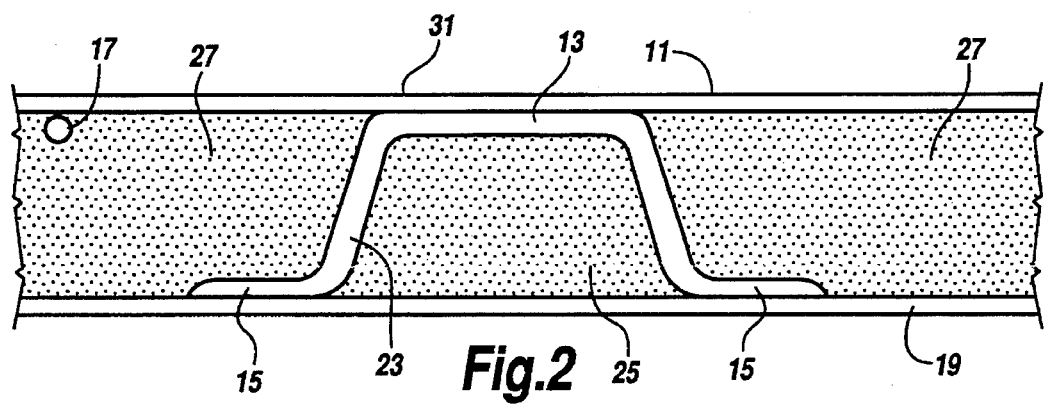
FIG. 2 is a cross-section view of the structure of the present invention taken along line A—A of FIGS. 1a and 1b.

FIG. 2 is a cross-section taken along line A—A of FIG. 1a and line A—A of FIG. 1b. FIG. 2 shows the lower, first or bottom wall or layer, 19, along with the upper, second or top wall or layer, 11. The reinforcing ribs are shown generally at 23. The feet of the reinforcing ribs, 15, are shown in integral contact with the lower wall, 19, and the top of the ribs, 13, are shown in integral contact with the upper wall, 11. The rib shaped foam, 25, is shown along with the bridging foam, 27. The leak alarm conduit is shown at 17. The chemically resistant barrier or layer is shown at 31. Note that the ribs, 23, are 100% bonded to the upper wall, 11, and the lower wall, 19, through the top of the ribs, 13, and the feet of the ribs, 15, respectively.

Figure 3:
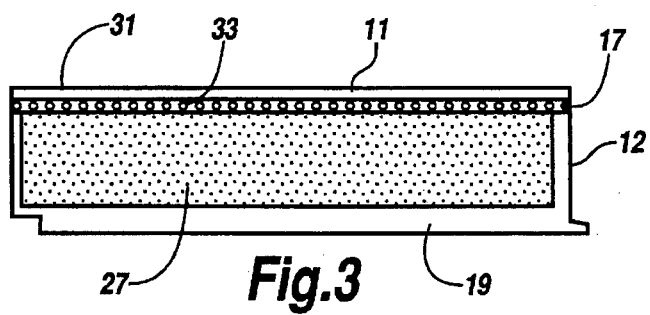
FIG. 3 is a cross-section view of the structure of the present invention taken along line B—B of FIGS. 1a and 1b.

FIG. 3 is a cross-section taken along line B—B of FIG. 1a and line B—B of FIG. 1b (Note: section line B—B lies on the approximate center-line of the leak alarm conduit, 17.) FIG. 3 shows a single panel-like section 12. FIG. 3 shows the lower or bottom wall or layer, 19, along with the upper or top wall or layer, 11. Note that the bottom layer, 19, has vertical walls on its sides. The leak alarm conduit, 17, is shown having openings, holes therein or perforations, 33, through which leaking liquids would be allowed to pass in order to reach the leak alarm cable (this cable is not shown in FIG. 3) which would be installed inside the conduit. The bridging foam is shown at, 27. The chemically resistant layer, 31, is also shown.

FIG. 4 is a plan view of one embodiment of the top of the panels, showing hidden lines of the leak alarm conduit only, wherein several sections of the present invention are shown arranged on the floor of a vertically walled storage tank. FIG. 4 shows the top layer, 11, of multiple sections, 12, along with the wall, 41, of a vertically walled storage tank. Note that FIG. 4 shows one embodiment of the present invention wherein the wall or floor sections are made in triangle shaped fashion. Note that the sections can be made in different shapes depending on the needs of the customer or particular application. Also note the sections, 12, are placed on the bottom of an existing tank in order to retrofit the tank so as to provide secondary containment as required by new environmental regulations. An exemplary configuration of the leak alarm conduit is shown, 17, along with a circumferential leak alarm conduit, 63.

FIG. 5 is similar to FIG. 4 except that the sections are rectangular shaped. The top layer, 11, of the sections, 12, are shown along with the tank wall, 41. Exemplary configurations of the leak alarm conduit, 17, and circumferential leak alarm conduit, 63, are shown.

FIG. 6 shows an elevation view of a vertically standing storage tank, 43, with a vertical wall, 41, top 45, and bottom, 47. The top or upper layer of the structures of the present invention are shown at, 11. Other details, i.e., hidden lines, of the structures are purposely omitted for ease of understanding.

FIG. 7 is a cross sectional view showing two sections of the present invention in order to illustrate how the sections would be joined together to form a bottom of a retrofitted tank. FIG. 7 is taken along a similar section as in FIG. 3. FIG. 7 shows the two sections 12, the upper layers, 11, the lower layers, 19, the bridging foam, 27, the leak alarm conduits, 17, having perforations therein, 33. The floor of the tank is shown at 51. The two sections are joined by a butt and strap joint, 53, with this joint being filled with resilient joint material (Pilgram or equal) at 55. The resilient joint material may be Pilgram Permacoat or equivalent and is believed to be made of vinyl resin ester. It is believed that it uses elongated fibers as the filler which doesn't necessarily have to be made of fiberglass, e.g., Cabasil made by Degussa. The butt and strap joint and resilient joint filler material is necessary to prevent leaks between the panels. Note that the sections have a lip, 57, which can be generally described as a modified Bell and Spigot joint (only the upper portion of the bell is used) which allows the sections or panels to be easily joined together. Note that this modified bell and spigot joint male portion or lip, 57, has a slight taper on it's upper edge shown at 59 which taper allows the lip to be easily fitted into the adjacent recess, 61, of each successive section or panel, 12. Additionally, FIG. 7 shows the circumferential leak alarm conduit, 63, and outer tank wall, 41. Additional resilient joint material is shown attaching the panel to the tank side wall at, 65, which both attaches and secures the panel to the side wall and prevents leaks between the panel and the side wall.

FIG. 8 shows a detailed elevation view of a typical butt and strap joint. The upper layer of two adjacent panels, 11, are shown along with the butt and strap joint, 53. The joint, 53, is made by butting the square cut ends of two panel-like sections together and applying a resin/fiberglass overlay, 53, to the prepared interior and exterior areas around the joint line, 54. This type of joint is typically used during fabrication of fittings and special components.

FIG. 9 shows an embodiment using a steel flashing-like member, 71, for attaching the panels to the vertical side walls of a tank. Therein is shown the panel section, 12, with its top, 11, and the circumferential leak alarm conduit, 63. The tank bottom, 51, and the side wall, 41, are shown. The steel flashing-like member, 71, is shown connected to both the steel tank wall, 41, and the top of the panel, 11. The steel flashing, 71, is attached to the vertical tank wall, 41, typically by a welding means, 73, or other attachment means appropriate for joining steel members. The steel flashing, 71, is attached to the top of the panel, 11, by a fiber reinforced plastic or like material in the form of another butt and strap joint, 75. Resilient joint material, 77, is shown to further seal the tank bottom and prevent leaks between the tank and panels.

FIG. 10 shows another embodiment for attaching the panels to the vertical side walls of a steel storage tank. Therein is shown the panel, 12, its top, 11, the circumferential leak alarm conduit, 63, the tank bottom, 51, and the vertical tank side wall, 41. A fiber reinforced plastic or like material in the form of another butt and strap joint, 75, is used to attach and seal the panel, 12, to the steel tank side wall, 41. Resilient joint material, 77, is shown to further seal the space between the tank wall, 41, and panel, 12.

EXAMPLE 1

Figure 11:
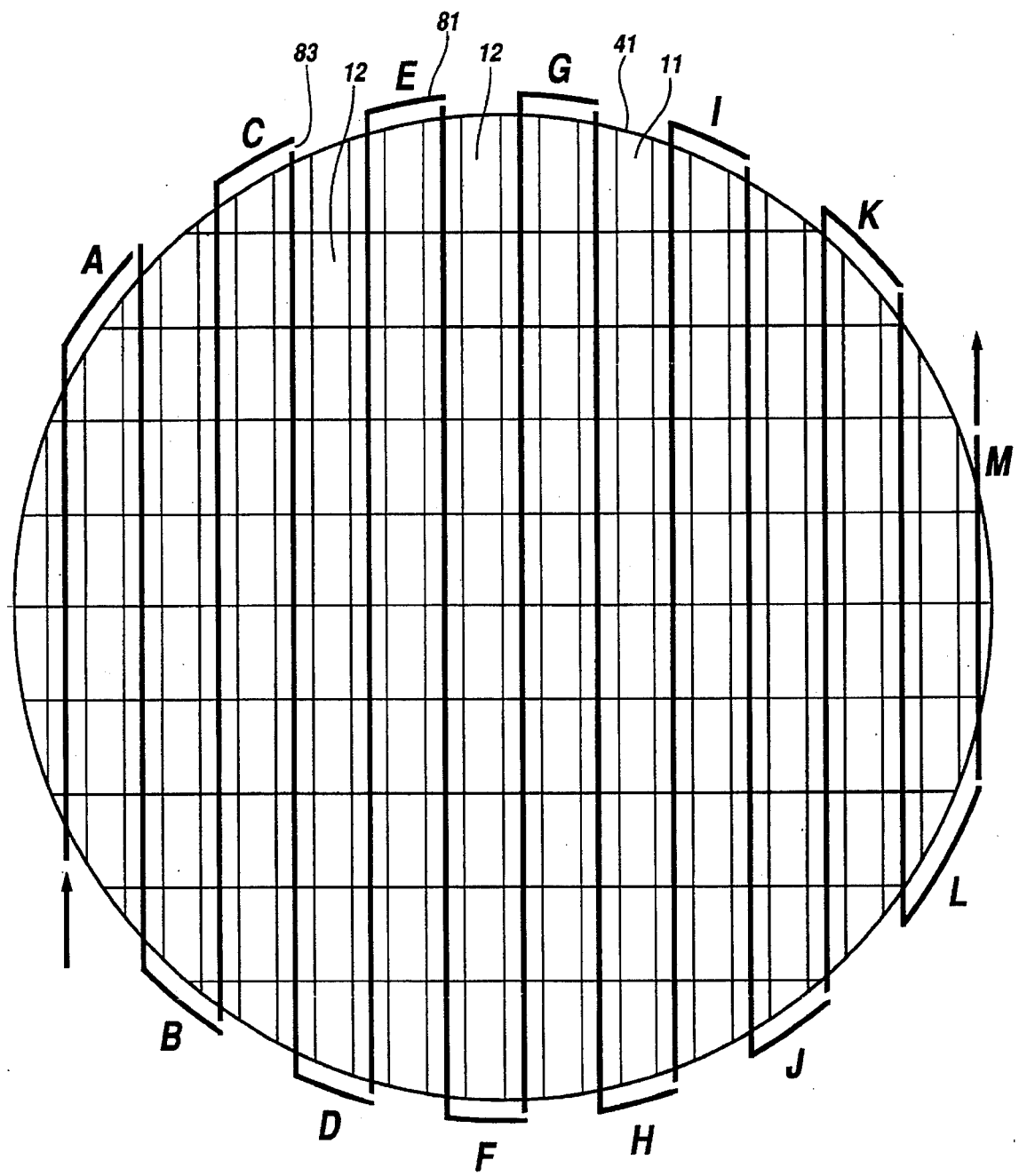
FIG. 11 is a plan view of the top layer of the present invention showing an exemplary leak alarm cable configuration.

FIG. 11 shows an exemplary configuration of laying out the panels and leak alarm conduits and cable for an approximate 210 feet diameter storage tank floor. The tank wall is shown at, 41, along with the leak alarm cable, 81. Effective connecting or coupling means, 83, is provided to connect succeeding sections of the leak alarm cable which has been passed through all the leak alarm conduits (not shown). The panels are shown at, 12, along with the top of the panels, 11. Note that the portions of the leak alarm cable, 81, that would normally be shown as hidden (dashed) lines are shown as solid lines for ease of understanding. Succeeding sections of the leak alarm cable are shown at A, B, C, D, E, F, G, H, I, J, K, L, and M.

I claim:

1. A multi-walled structure having improved strength characteristics comprising:

(a) a first containment wall comprised of chopped fiberglass;

(b) a plurality of support ribs of chopped fiberglass integrally bonded to said first containment wall;

(c) a first layer of closed cell foam located between said first containment wall and the inside surface of said support ribs;

(d) a second containment wall comprised of chopped fiberglass;

(e) a second layer of closed cell foam located between said second containment wall and the outside surface of said support ribs; and (f) said second containment wall integrally bonded to said support ribs.

2. The structure of claim 1, further comprising a chemically resistant barrier on the inner surface of the second containment wall.

3. The structure of claim 1, wherein said second layer of closed cell foam is substantially level with the top of said support ribs.

4. The structure of claim 1, wherein said first and second layers of closed cell foam are comprised of polyurethane.

5. The structure of claim 1, further comprising a leak alarm safety monitor to detect liquid seepage.

6. The structure of claim 6, wherein said leak alarm safety monitor further comprises a conduit.

7. The structure of claim 6, wherein said leak alarm safety monitor pinpoints the leak along the length of said structure.

* * * * *